US010780887B2

(12) United States Patent
Woopen et al.

(10) Patent No.: US 10,780,887 B2
(45) Date of Patent: Sep. 22, 2020

(54) UTILITY VEHICLE AND METHOD FOR OPERATING A UTILITY VEHICLE HAVING A FOUR-WHEEL DRIVE AND A DIFFERENTIAL LOCK

(71) Applicant: DEERE & COMPANY, Moline, IL (US)

(72) Inventors: Thomas Woopen, Windeck (DE); Florian Reinmuth, Sinsheim (DE)

(73) Assignee: Deere & Company, Moline, IL (US)

( * ) Notice: Subject to any disclaimer, the term of this patent is extended or adjusted under 35 U.S.C. 154(b) by 4 days.

(21) Appl. No.: 16/158,817

(22) Filed: Oct. 12, 2018

(65) Prior Publication Data

US 2019/0126929 A1 May 2, 2019

(30) Foreign Application Priority Data

Oct. 26, 2017 (DE) ........................ 10 2017 219 271

(51) Int. Cl.
| | | |
|---|---|---|
| *B60W 30/18* | (2012.01) | |
| *B60W 40/064* | (2012.01) | |
| *B60W 10/16* | (2012.01) | |
| *B60W 10/12* | (2012.01) | |

(Continued)

(52) U.S. Cl.
CPC ..... *B60W 30/18172* (2013.01); *B60K 17/348* (2013.01); *B60W 10/12* (2013.01); *B60W 10/16* (2013.01); *B60W 40/064* (2013.01); *B60W 40/068* (2013.01); *B60W 2510/0666* (2013.01); *B60W 2510/125* (2013.01); *B60W 2510/18* (2013.01); *B60W 2520/10* (2013.01);

(Continued)

(58) Field of Classification Search
USPC .............................................. 180/249; 701/69
See application file for complete search history.

(56) References Cited

U.S. PATENT DOCUMENTS

| 4,966,249 A | * | 10/1990 | Imaseki | ............ | B60K 23/0808 |
| | | | | | 180/197 |
| 4,966,250 A | * | 10/1990 | Imaseki | ............ | B60K 23/0808 |
| | | | | | 180/197 |

(Continued)

FOREIGN PATENT DOCUMENTS

| DE | 2022469 A1 | 11/1970 |
| DE | 10317450 A1 | 10/2004 |

(Continued)

OTHER PUBLICATIONS

European Search Report issued in counterpart application No. 18202337.4 dated May 6, 2019. (8 pages).

(Continued)

*Primary Examiner* — Dirk Wright

(57) ABSTRACT

A utility vehicle and a method of operating a utility vehicle having a rear axle driven by a drive engine, a rear axle differential on the rear axle, and a front axle that is configured to be switched on to perform four-wheel drive are provided. The method includes activating a differential lock for locking the rear axle differential on the basis of at least one of a rear axle slippage variable, which characterizes a drive slippage occurring at the rear axle, an engine power of the drive engine, a status of at least one brake device associated with the rear axle, and a status regarding the four-wheel drive.

20 Claims, 3 Drawing Sheets

(51) Int. Cl.
*B60W 40/068* (2012.01)
*B60K 17/348* (2006.01)

(52) U.S. Cl.
CPC ..... *B60W 2520/26* (2013.01); *B60W 2520/28* (2013.01); *B60W 2710/125* (2013.01)

(56) References Cited

U.S. PATENT DOCUMENTS

| | | | | |
|---|---|---|---|---|
| 5,332,059 A | * | 7/1994 | Shirakawa | B60K 23/04 180/197 |
| 5,701,247 A | * | 12/1997 | Sasaki | B60K 23/0808 180/197 |
| 5,742,917 A | * | 4/1998 | Matsuno | B60K 17/3462 180/197 |
| 6,708,088 B2 | * | 3/2004 | Matsuno | B60T 8/172 701/1 |
| 6,877,573 B2 | * | 4/2005 | Hasegawa | B60K 17/34 180/24.01 |
| 7,290,634 B2 | * | 11/2007 | Clare | B60K 23/0808 180/249 |
| 7,386,383 B2 | * | 6/2008 | Yoneda | B60K 17/20 180/242 |
| 7,553,255 B2 | * | 6/2009 | Torres | B60K 17/20 180/249 |
| 7,607,506 B2 | * | 10/2009 | Matsuno | B60K 23/0808 180/197 |
| 7,613,558 B2 | * | 11/2009 | Yoneda | B60K 23/0808 123/90.15 |
| 7,734,402 B2 | * | 6/2010 | Ushiroda | B60W 10/119 701/69 |
| 7,770,681 B2 | * | 8/2010 | Marathe | B60K 28/165 180/197 |
| 7,797,094 B2 | * | 9/2010 | Miura | B60T 8/1755 180/197 |
| 8,019,518 B2 | * | 9/2011 | Yamazaki | B60K 23/04 180/197 |
| 8,825,324 B2 | * | 9/2014 | Horaguchi | B60K 17/344 701/53 |
| 9,022,158 B2 | * | 5/2015 | Mita | B60K 17/34 180/233 |
| 9,114,706 B2 | * | 8/2015 | Mita | B60K 23/08 |
| 9,333,965 B2 | * | 5/2016 | Marsh | F16H 48/30 |
| 9,605,740 B2 | * | 3/2017 | Povirk | B60K 17/344 |
| 9,701,196 B2 | * | 7/2017 | Mita | B60K 23/08 |
| 9,873,426 B2 | * | 1/2018 | Paskus | B60T 8/1708 |
| 10,392,008 B2 | * | 8/2019 | Watanabe | B60W 10/18 |
| 2001/0004031 A1 | | 6/2001 | Hasegawa | |
| 2002/0153770 A1 | | 10/2002 | Matsuno et al. | |
| 2007/0179699 A1 | * | 8/2007 | Kinsey | B60K 28/165 701/82 |
| 2017/0291609 A1 | * | 10/2017 | Reich | B60W 30/188 |

FOREIGN PATENT DOCUMENTS

| | | |
|---|---|---|
| DE | 102015212897 A1 | 1/2017 |
| EP | 2730447 A1 | 5/2014 |
| GB | 2414525 A | 11/2005 |
| WO | 0249896 A1 | 6/2002 |

OTHER PUBLICATIONS

German Search Report issued in counterpart application No. 102017219271.2 dated Sep. 13, 2018. (12 pages).

* cited by examiner

UTILITY VEHICLE AND METHOD FOR OPERATING A UTILITY VEHICLE HAVING A FOUR-WHEEL DRIVE AND A DIFFERENTIAL LOCK

RELATED APPLICATION

This application claims priority under 35 U.S.C. § 119 to German patent application DE 102017219271.2, filed Oct. 26, 2017, the disclosure of which is incorporated herein by reference in its entirety.

BACKGROUND

Agricultural utility vehicles, such as the agricultural utility vehicle disclosed in DE 102015212897, may have four-wheel drive as well as a front-axle differential on the front axle and a rear-axle differential on the rear axle. A control unit may control a four-wheel clutch for activating and deactivating the four-wheel drive on the basis of a variety of criteria. There exists a need in the art for improvement of the traction of such four-wheel driven utility vehicles.

SUMMARY

Various aspects of embodiments of the present disclosure are set out in the claims.

In accordance with an embodiment of the present disclosure, a method for operating a utility vehicle is provided in which the utility vehicle has a rear axle driven by a drive engine, a differential on the rear axle (hereinafter rear-axle differential) and a front axle that can be switched on for performing four-wheel operation. In addition, a differential lock for locking the rotational speed compensation on the rear axle produced by the rear-axle differential is provided. The differential lock can be activated on the basis of one or more of the following criteria, parameters or variables:

a. a rear-axle slippage variable $\mu_H$, which characterizes a drive axle slippage occurring at the rear axle,
    b. an engine power P of the drive engine,
    c. a status of at least one brake device associated with the rear axle, and
    d. a status with respect to the four-wheel drive.

Taking into account at least one of the above-mentioned criteria, parameters or variables enables a driver-independent, automated activation of the differential lock under specific boundary conditions. Thus the traction in the utility vehicle can be automatically increased, for example, if activation of the four-wheel drive does not guarantee sufficient traction for the utility vehicle. This may be the case during heavy field cultivation, plowing for example, or for difficult soil properties with different wheel loads on the right and left sides. In such cases, an automated activation of the differential lock offers traction assistance to fit the requirement, because the drive torque at the rear axle is no longer distributed in a 50%/50% left-right ratio, but is instead distributed to the right and left on the rear axle as needed. The driver of the utility vehicle is considerably relieved by this automated traction assistance.

It is accordingly advantageous to take a drive wheel slippage at the rear axle into account for an automated activation of the differential lock.

If no information on the drive wheel slippage can be provided (e.g. if no GPS navigation system or radar is available), an engine power of the drive engine can alternatively be checked, in order to avoid an unnecessary activation of the differential lock under a low engine load and consequently low drive slippage. The engine load is used here as an indicator of the maximum drive slippage to be expected if the slippage is not known.

Because it may be desirable to avoid locking of the rear axle differential during a braking operation, it is also possible to check the status of at least one brake associated with the rear axle in order to decide on the basis of this checking result whether to activate the differential lock. A brake device may be associated with each rear wheel, the brake devices being operable separately from one another. The current status is derived in particular from a signal as to whether the respective brake device is currently actuated to brake the associated rear wheel or not.

Alternatively or additionally, it is possible to take into account a status regarding the four-wheel drive, in order to decide an activation of the differential lock on the basis of the determined status. Thus an activation of the differential lock is usually not efficient or meaningful if a driver-dependent deactivation of the four-wheel drive has been determined. The status with respect to the four-wheel drive can be, for example, "ON" (driver-dependent activation), "OFF" (driver-dependent deactivation) or "AUTO" (driver-independent automated activation (ON) and deactivation (OFF) of the four-wheel drive). The current status may be stored in a microprocessor-controlled control unit, which is used for carrying out the method, more particularly for detecting, determining, calculating and/or processing the above-mentioned, and possibly additional, criteria, parameters and variables.

The utility vehicle in an embodiment is an agricultural vehicle, such as a tractor, or a construction machine, to name non-limiting examples. The utility vehicle includes one or more other vehicle types in additional embodiments. The drive engine of an embodiment is an internal combustion engine, such as a gasoline or diesel engine to name non-limiting examples, but may include or take the form of another power source including, without limitation, an electric, hydraulic, pneumatic or other motor or actuator.

The rear wheel slippage variable $\mu_H$ can be advantageously determined or calculated by forming the ratio between the instantaneous travel speed v of the utility vehicle and a wheel circumferential velocity $v_H$ occurring at the rear axle:

$$\mu_H = (v_H - v)/v_H.$$

The wheel circumferential velocity $v_H$ is determined from the tire circumference of the rear wheels, presumed to be known, as a function of an associated wheel rotational speed $n_H$.

The instantaneous travel speed can be derived, for example, by detecting temporal changes of position of the utility vehicle. The latter can be provided by means of a GPS navigation system in the form of corresponding position information.

For an efficient functionality of the automated activation of the differential lock, it is advantageous to first compare the determined rear wheel slippage variable $\mu_H$ to at least one predetermined slippage limit value before a decision is made regarding activation of the differential lock. The determined rear wheel slippage variable $\mu_H$ is successively compared to a first slippage limit value $\mu_{lim1}$ and a second slippage limit value $\mu_{lim2}$. In this way, it is possible to determine suitable drive slippage ranges within which an activation of the differential lock to increase the traction makes sense. For example, the first slippage limit value $\mu_{lim1}$ may be larger (e.g. 40% drive slippage) than the second slippage limit value $\mu_{lim2}$ (e.g. 15% drive slippage).

If the utility vehicle has no GPS navigation system, an engine power P of the utility vehicle can be used instead of the rear wheel slippage variable $\mu_H$ as a parameter for an activation of the differential lock.

Information on the engine power P can be provided with low effort technically if the engine power P is determined on the basis of the instantaneous engine operating point in the form of a percentage engine load from an engine characteristic curve stored in an engine control unit. The engine power is then available as corresponding data on a bus (e.g. CAN) of the utility vehicle.

In another embodiment, the engine power P can also be used in addition to the determined rear wheel slippage variable $\mu_H$ in order to effect a needs-based activation of the differential lock.

To support a needs-based activation of the differential lock, the engine power P may be compared to a predetermined power limit value $P_{lim}$ prior to an activation. An activation is then dependent on the comparison result. Thus the predetermined power limit value $P_{lim}$ can have a value in the range of 70% to 90% of the full engine load, for example. If the currently determined percentage engine load is at least as large as the predetermined power limit value $P_{lim}$, then an elevated power requirement, and thus a corresponding increase of the drive wheel slippage, can be indirectly deduced. For this comparison result, an automatic activation of the differential lock therefore makes sense in order to efficiently reduce the drive wheel slippage.

For an efficient traction assistance, it is advantageous if—apart from satisfying any additional predetermined conditions—the differential lock is not activated until the four-wheel drive has already been activated.

To further increase the efficiency of the differential lock used, it may be deactivated automatically. A driver-independent automated deactivation is performed particularly on the basis of at least one of the following criteria, parameters or variables:

a rear-axle slippage variable $\mu_H$, which characterizes a drive axle slippage occurring at the rear axle, an engine power P of the drive engine, a status of at least one brake device associated with the rear axle, and a status with respect to the differential lock.

The meaning of the criteria, parameters or variables described here has already been described extensively in relation to the activation of the differential lock. Thus a deactivation of the differential lock can be initiated on the basis of at least one slippage limit value and/or at least one power limit value. Consequently the locking of the rear axle differential can be canceled on an automated basis by the utility vehicle if less work to be done is detected. Because the status of at least one brake device associated with the rear axle is considered, the differential lock can also be automatically deactivated in the case of a braking process in order to allow evasion maneuvering when braking at a very early time.

The values of the predetermined slippage limit values and/or power limit values for a deactivation of the differential lock are smaller in an embodiment than the values of the respective limit values that are specified in the method for activating the differential lock.

Alternatively or additionally, it is possible to take into account a status regarding the differential lock, in order to decide regarding an activation of the differential lock on the basis of the determined status. The status can be, for example, "ON" (driver-dependent activation), "OFF" (driver-dependent deactivation) or "AUTO" (driver-independent automated activation (ON) and deactivation (OFF) of the differential lock). The current status is stored in an embodiment in a microprocessor-controlled control unit, which is used for carrying out the method, more particularly for detecting, determining, calculating and/or processing the above-mentioned, and possibly additional, criteria, parameters and variables. For example, the status "AUTO (OFF)" is set if a predetermined limit steering angle is exceeded or if a predetermined limit speed is exceeded, in order to avoid locking of the rear axle differential during cornering or at high speeds of the utility vehicle. The status "AUTO (OFF)" automatically leads to a deactivation of the differential lock.

The utility vehicle of an embodiment has a suitable arrangement for performing the method. In particular, this arrangement includes a control unit which captures, determines and processes the above-mentioned information and data and thereby can initiate a needs-based and automated, i.e. driver-independent, activation and deactivation of both the four-wheel drive and the differential lock.

According to an aspect of the present disclosure, a method for operating a utility vehicle having a rear axle driven by a drive engine, a rear axle differential on the rear axle, and a front axle that is configured to be switched on to perform four-wheel drive is provided. The method includes activating a differential lock for locking the rear axle differential on the basis of at least one of a rear axle slippage variable, which characterizes a drive slippage occurring at the rear axle, an engine power of the drive engine, a status of at least one brake device associated with the rear axle, and a status regarding the four-wheel drive.

According to an aspect of the present disclosure, a utility vehicle is provided. The utility vehicle includes a rear axle driven by a drive engine, a rear axle differential on the rear axle, a front axle that is configured to be switched on to perform four-wheel drive, and a differential lock configured to lock the rear axle differential. The differential lock is configured for activation on the basis of at least one of a rear axle slippage variable, which characterizes a drive slippage occurring at the rear axle, an engine power of the drive engine, a status of at least one brake device associated with the rear axle, and a status regarding the four-wheel drive.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
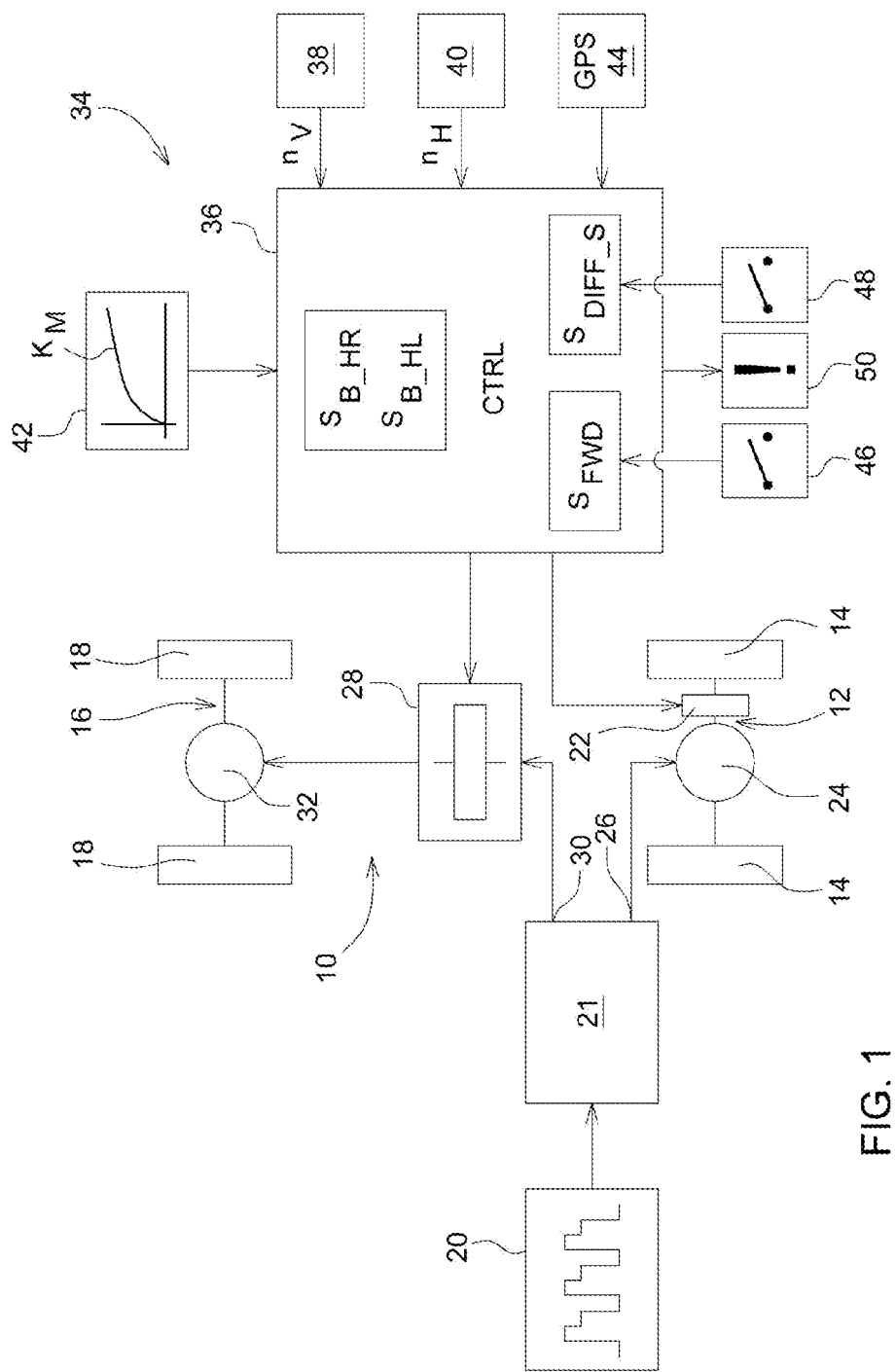
FIG. 1 illustrates a utility vehicle in accordance with an embodiment of the present disclosure.
Figure 2:
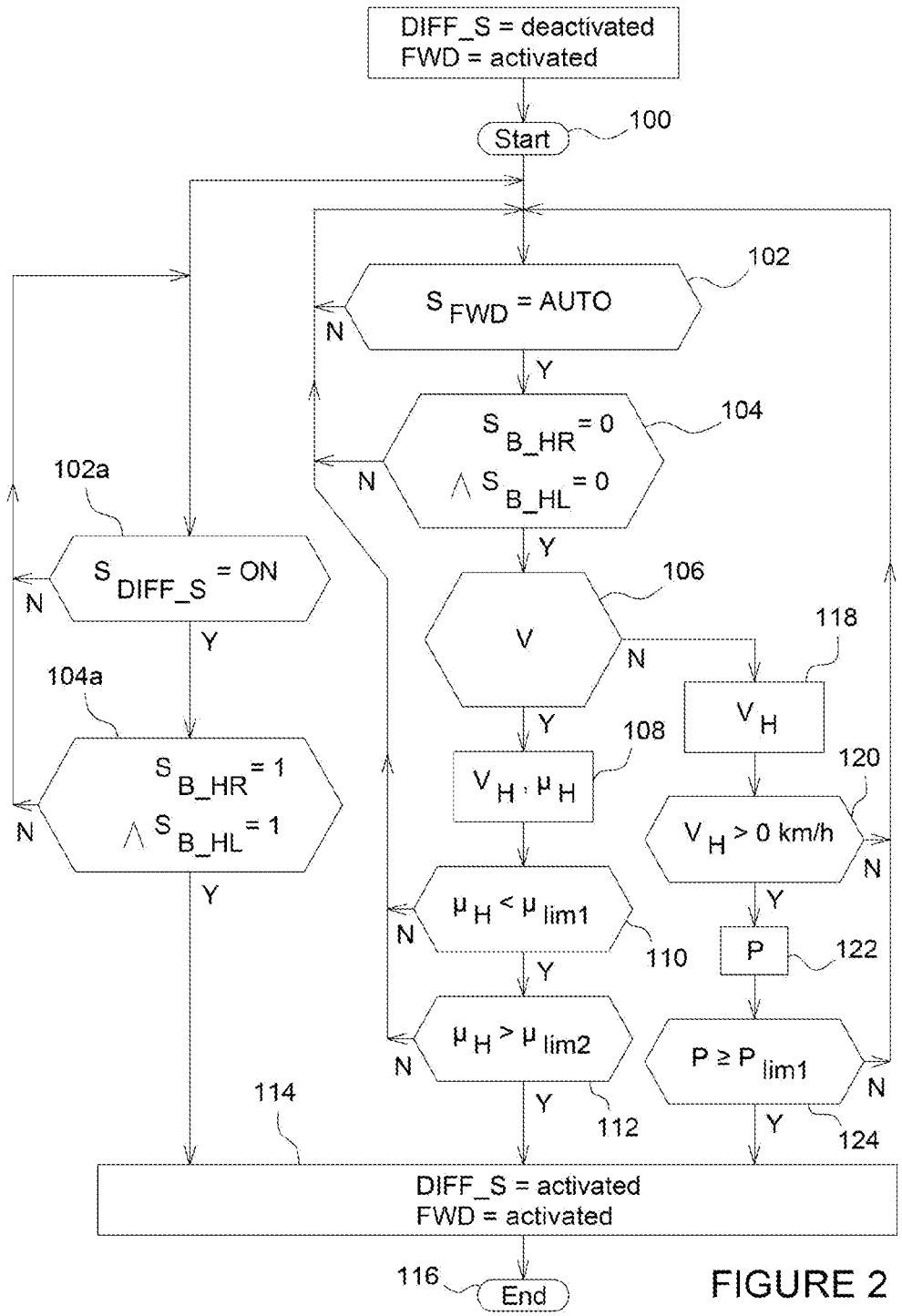
FIG. 2 illustrates a flow chart for a method in accordance with an embodiment of the present disclosure.
Figure 3:
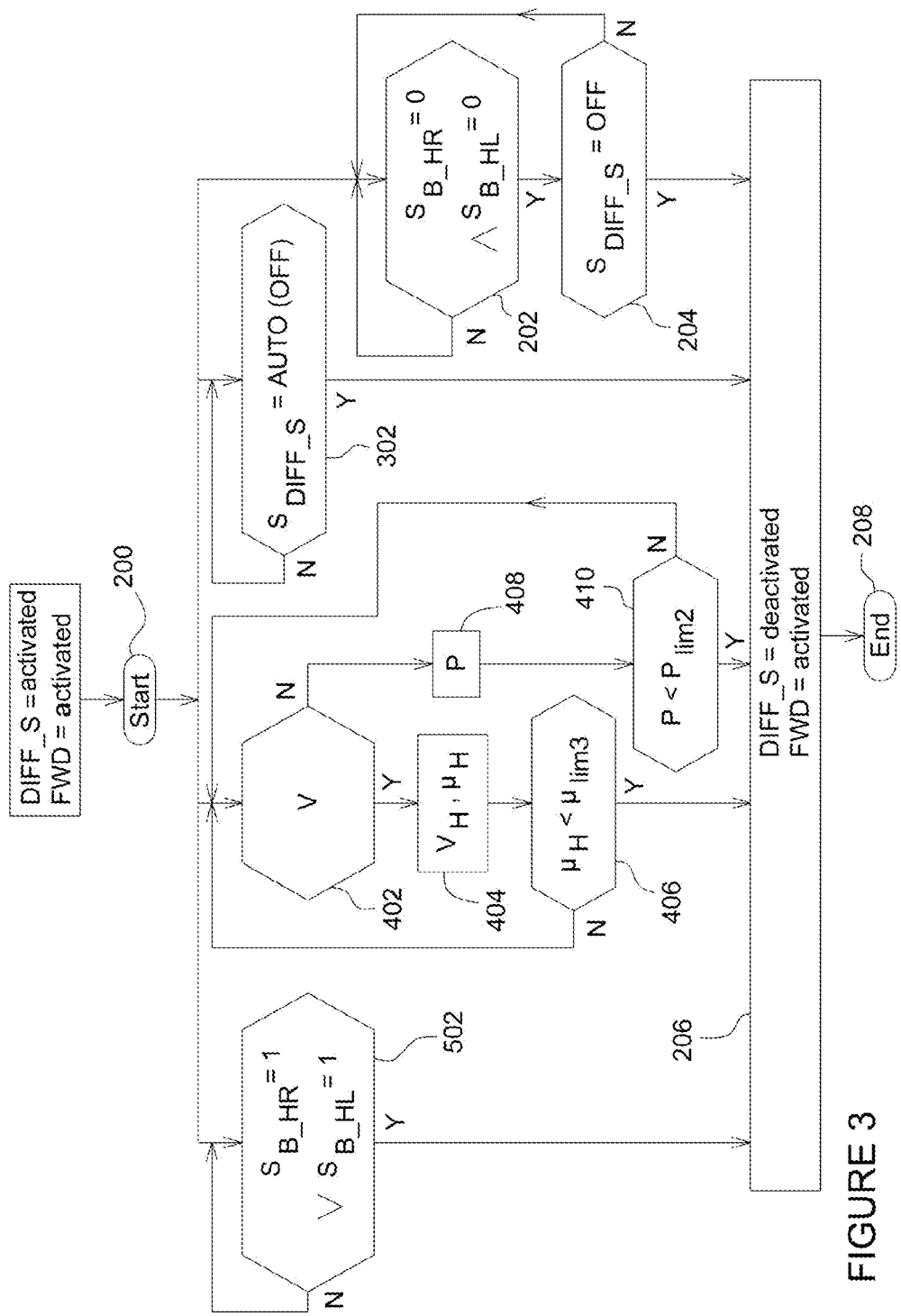
FIG. 3 illustrates a flow chart for a method in accordance with an embodiment of the present disclosure.

At least one embodiment of the subject matter of this disclosure is understood by referring to FIGS. 1 through 3 of the drawings.

FIG. 1 schematically shows a utility vehicle, which is designed according to one embodiment as a tractor 10. The tractor 10 has a rear axle 12 with rear wheels 14 and a front axle 16 that can be activated for four-wheel drive and has front wheels 18. An internal combustion engine 20 designed as a diesel engine is connected via a crankshaft to a vehicle transmission 21. The vehicle transmission 21 includes a rear axle transmission output 26 connected via a rear axle differential 24 to the rear axle 12, and a front axle transmission output 30 that can be activated via a four-wheel clutch 28. The front axle transmission output 30 can be connected via a front axle differential 32 to the front axle 16. In addition, a differential lock 22 is arranged on the rear axle 12 and can be activated to lock the rear axle differential 24 if necessary.

An arrangement 34 is a component of an engine and transmission system of the utility vehicle and includes a microprocessor-controlled control unit 36. The latter is used for coordination of the four-wheel drive and the differential lock 22, including a driver-independently conducted activation and deactivation.

The four-wheel clutch 28 in one embodiment is actuated electro-hydraulically by the control unit 36 in a manner not presented here in detail.

Wheel speed sensors 38 and 40 associated respectively with the front and rear wheels 18 and 14 of the tractor 10 are used for capturing associated wheel rotational speeds $n_V$ and $n_H$, and the rotational speed signals generated by the wheel rotational speed sensors 38 and 40 are evaluated by the control unit 36.

In addition, the control unit 36 receives information regarding the instantaneous engine operating point of the internal combustion engine 20. A corresponding engine characteristic curve $K_M$ is provided by an engine control device 42. A GPS navigation system 44 is also used for detecting a position of the tractor 10.

An actuating element 46 in the form of a switch allows a manual activation and deactivation of the four-wheel drive. The actuating element 46 is designed as a mechanical switch, for example. In a graphical user interface, a software implementation of the actuating element 46 in the form of an operating element displayed on a touchscreen is also possible.

An additional actuating element 48 in the form of a switch allows manual activation and deactivation of the differential lock 22. Analogously to the actuating element 46, the actuating element 48 is designed as a mechanical switch or an operating element on a touchscreen, for example.

The driver is informed by means of a display element 50 of the current activation state (activated or deactivated) of the four-wheel drive. The same display element 50 or an additional display element is used to inform the driver with respect to the current activation state (activated or deactivated) of the differential lock 22. For an update of the respective activation state, the control unit 36 determines the switching positions of the actuating elements 46 and 48, among other things. For this purpose, a current status $S_{FWD}$ of the actuating element 46 and a current status $S_{DIFF\_S}$ of the actuating element 48 are stored in the control unit 36.

For example, the status $S_{FWD}$ of the control unit 36 or the actuating element 46 can have the following states: "ON" (driver-dependent continuous activation of the four-wheel drive), "OFF" (driver-dependent continuous deactivation of the four-wheel drive) and "AUTO" (driver-independent activation (ON) and deactivation (OFF) of the four-wheel drive).

The status of the control unit 36 or the actuating element 48 can have the following states for example: "ON" (driver-dependent continuous activation of the differential lock 22), "OFF" (driver-dependent continuous deactivation of the differential lock 22) and "AUTO" (driver-independent activation (ON) and deactivation (OFF) of the differential lock 22).

FIG. 2 shows a flowchart that reproduces a method for activating the differential lock 22 in accordance with an embodiment. The method performed by the control unit 36 is initialized in a starting step 100 when a deactivated differential lock 22 (DIFF_S=deactivated) and already activated four-wheel drive (FWD=activated) are detected. The control unit 36 checks different criteria and/or physical variables and activates the differential lock 22 (DIFF_S=activated) after detecting or checking different possible starting situations.

In a starting situation, the current status $S_{FWD}$ of the actuating element 46 is first checked in a step 102. In status "AUTO" (driver-dependent activation and deactivation of the four-wheel drive) the current status of two brake devices, not shown here in detail, that are each associated with a rear wheel 14 is checked in a subsequent step 104. The two rear wheels 14 can thus be braked independently of one another if necessary.

If it is detected in step 104 that the right-hand rear wheel 14 is not being braked (Status $S_{B\_HR}$=0) and the left-hand wheel 14 is not being braked (Status $S_{B\_HL}$=0), it is checked in an additional step 106 whether the instantaneous travel speed v of the tractor 10 relative to the ground can be determined. The instantaneous travel speed v is derived by the control unit 36 by detecting temporal changes of the position of the tractor 10. These changes of position are provided to the control unit 36 by the GPS navigation system 44 in the form of corresponding position information.

If the instantaneous travel speed v has been determined in step 106, a wheel circumferential velocity $v_H$ occurring at the rear axle 12 and thereafter a rear wheel slippage variable $\mu_H$ are calculated by the control unit 36 in a step 108. The wheel circumferential velocity $v_H$ is determined from the tire circumference of the rear wheels 14, presumed to be known, as a function of the wheel rotational speed $n_H$ detected by means of the wheel speed sensors 40. The rear wheel slippage variable $\mu_H$, which characterizes a drive wheel slippage occurring at the rear axle 12 of the tractor 10, is calculated by taking a ratio between the instantaneous travel speed v of the tractor 10 and the wheel circumferential velocity $v_H$:

$$\mu_H = (v_H - v)/v_H.$$

In a step 110, the control unit 36 compares the calculated rear wheel slippage variable $\mu_H$ to a predetermined first slippage limit value $\mu_{lim1}$, which corresponds, for example, to a drive slippage of 40%.

If the calculated rear wheel slippage variable $\mu_H$ is less than the predetermined first slippage limit value $\mu_{lim1}$, the rear wheel slippage variable $\mu_H$ is compared in a step 112 to a predetermined second slippage limit value $\mu_{lim2}$, which corresponds to a drive slippage of 15%, for example. A distinction can also be made here as to whether the slippage is negative (e.g. downhill travel of the tractor with its trailer) or positive (uphill travel of the trailer with its tractor).

The absolute value of the predetermined first slippage limit value $\mu_{lim1}$ of an embodiment is greater than the absolute value of the predetermined second slippage limit value $\mu_{lim2}$.

If it is determined in step 112 that the rear wheel slippage variable $\mu_H$ is greater than the predetermined second slippage limit value $\mu_{lim2}$, then the control unit 36 activates the differential lock 22 in a step 114 independently of the driver (DIFF_S=activated). The four-wheel drive, which was already activated at the beginning of this method, remains activated (FWD=activated). After step 114, the method is terminated in a step 116.

If it is determined in step 106 that the tractor 10 does not have a GPS navigation system 44 or the like to determine the instantaneous travel speed v, a step 118 follows step 106. In step 118, the wheel circumferential velocity $v_H$ occurring at the rear axle 12 is determined as already explained for step 108. Thereafter it is checked in step 120 whether the determined wheel circumferential velocity $v_H$ is >0 km/h. This ensures that the differential lock 22 is activated only for a moving tractor 10.

If $v_H > 0$ km/h, the control unit 36 determines an engine power P of the internal combustion engine 20 in a subsequent step 122. The engine power P is determined by the control unit 36 on the basis of an instantaneous engine operating point in the form of a percentage motor load by reading out an engine characteristic curve $K_M$ stored in an engine control unit 42.

In a subsequent step 124, the determined engine power P is compared to a predetermined first power limit value $P_{lim1}$, which corresponds to a percentage motor load in the range of 70% to 90%. If it is determined in step 124 that the engine power P is at least as large as the predetermined first power limit value $P_{lim1}$, then the control unit 36 activates the differential lock 22 in step 114 driver-independently, as already explained.

In an additional starting situation at the starting step 100, the control unit 36 checks the status $S_{DIFF\_S}$ of the actuating element 48 in a step 102a. If the status is "ON," it is checked in a subsequent step 104a whether the already mentioned brake devices for the two rear wheels 14 have been actuated or not. If it is detected in step 104a that the brake device for the right-hand rear wheel 14 has not been actuated (Status $S_{B\_HR}=0$) and that the brake device for the left-hand rear wheel 14 has also not been actuated (Status $S_{B\_HL}=0$), then the control unit 36 activates the differential lock 22 in step 114 driver-independently, as already explained.

FIG. 3 shows a flowchart of an embodiment that reproduces a method for deactivating the differential lock 22. The method performed by the control unit 36 is initialized in a starting step 200 when an activated differential lock 22 (DIFF_S=activated) and activated four-wheel drive (FWD=activated) are detected. The control unit 36 checks different criteria and/or physical variables and deactivates the differential lock 22 (DIFF_S=deactivated) after detecting or checking different possible starting situations.

In one starting situation, it is first checked in a step 202 whether the already explained brake devices of the two rear wheels 14 have been activated for braking or not. If the right-hand rear wheel 14 is not being braked (Status $S_{B\_HR}=0$) and the left-hand rear wheel 14 is not being braked (Status $S_{B\_HL}=0$), then the control unit 36 checks the status $S_{DIFF\_S}$ of the actuating element 48 in a subsequent step 204. If the driver has issued a command for switching off or deactivating the differential lock 22 to the actuating element 48, then the status $S_{DIFF\_S}$=OFF is determined in step 204. In this case, the control unit 36 deactivates the differential lock 22 in a step 206 (DIFF_S=deactivated). The four-wheel drive, which was already activated at the beginning of this method, remains activated (FWD=activated). After step 206, the method is terminated in a step 208.

According to another embodiment, the control unit 36 checks in a step 302 following the starting step 200 whether the differential lock 22 should be deactivated on an automated basis, i.e. driver-independently, due to detected specific physical or driving-dynamic boundary conditions. For example, the activated differential lock 22 should be automatically deactivated by the control unit 36 if it has been detected that a predetermined steering angle limit value (cornering) or a predetermined travel speed limit value of the tractor 10 has been exceeded. The detection of such physical or driving-dynamic boundary conditions is symbolized in step 302 with the status $S_{DIFF\_S}$=AUTO (OFF). Thereafter the control unit 36 deactivates the differential lock 22 in step 206, as already explained.

In another variant, the control unit 36 checks in a step 402 following the starting step 200 whether the instantaneous travel speed v of the tractor 10 relative to the ground can be determined. If the travel speed v can be determined, then in a subsequent step 404, the wheel circumferential velocity $v_H$ occurring at the rear axle 12 is first calculated and then the rear wheel slippage variable $\mu_H$ is calculated. To avoid unnecessary repetitions, the reader is referred with respect to the determination of the travel speed v, the wheel circumferential velocity $v_H$ and the rear wheel slippage variable $\mu_H$ to the corresponding explanations for the flowchart in FIG. 2.

In a subsequent step 406, the control unit 36 compares the calculated rear wheel slippage variable $\mu_H$ to a predetermined third slippage limit value $\mu_{lim3}$, which corresponds, for example, to a drive slippage of 10%. The predetermined third slippage limit value $\mu_{lim3}$ in an embodiment is less than the predetermined second slippage limit value $\mu_{lim2}$. If the calculated rear wheel slippage variable $\mu_H$ is less than the predetermined third slippage limit value $\mu_{lim3}$, then the control unit 36 deactivates the rear axle differential 24 in step 206, as already explained. Otherwise the process returns to step 402.

If it is determined in step 402 that the tractor 10 does not have a GPS navigation system 44 and that the instantaneous travel speed v cannot be determined, a step 408 follows step 402. In step 408, the control unit 36 determines the engine power P of the internal combustion engine 20. To avoid unnecessary repetitions, the reader is referred to the explanations for the flow chart of FIG. 2, in particular step 122.

In a subsequent step 410, the determined engine power P is compared to a predetermined second power limit value $P_{lim2}$, which corresponds to a percentage motor load of 80%, for example. The predetermined first power limit value $P_{lim1}$ of an embodiment is greater than the predetermined second power limit value $P_{lim2}$.

If it is determined in step 410 that the engine power P is less than the predetermined second power limit value $P_{lim2}$, then the control unit 36 deactivates the differential lock 22 in step 206 independently of the driver. Otherwise the process returns to step 402.

In an embodiment, the control unit 36 again checks the status of the already explained brake devices of the two rear wheels 14 in a step 502 following the starting step 200. If the control unit 36 determines that at least one of the two brake devices has been actuated (Status $S_{B\_HR}=1$ and/or Status $S_{B\_HL}=1$), then the control unit 36 deactivates the differential lock 22 in step 206, as already explained.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A method for operating a utility vehicle having a rear axle driven by a drive engine, a rear axle differential on the rear axle, and a front axle that is configured to be switched on to perform four-wheel drive, the method comprising:
   activating a differential lock for locking the rear axle differential on the basis of at least one of a rear axle slippage variable, which characterizes a drive slippage occurring at the rear axle, an engine power of the drive engine, a status of at least one brake device associated with the rear axle, and a status regarding the four-wheel drive; and
   determining the rear wheel slippage variable from a ratio between an instantaneous travel speed of the utility vehicle and a wheel circumferential velocity occurring at the rear axle.

2. The method according to claim 1, further comprising comparing the rear axle slippage variable to at least one predetermined slippage limit value before activating the differential lock.

3. The method according to claim 1, further comprising activating the four-wheel drive before activating the differential lock.

4. The method according to claim 1, further comprising deactivating the activated differential lock on the basis of at least one of the rear axle slippage variable, the engine power of the drive engine, the status of at least one brake device associated with the rear axle, and a status regarding the differential lock.

5. A method for operating a utility vehicle having a rear axle driven by a drive engine, a rear axle differential on the rear axle, and a front axle that is configured to be switched on to perform four-wheel drive, the method comprising:
   activating a differential lock for locking the rear axle differential on the basis of at least one of a rear axle slippage variable, which characterizes a drive slippage occurring at the rear axle, an engine power of the drive engine, a status of at least one brake device associated with the rear axle, and a status regarding the four-wheel drive; and
   comparing the engine power to a predetermined power limit value before activating the differential lock.

6. The method according to claim 5, further comprising determining the rear wheel slippage variable from a ratio between an instantaneous travel speed of the utility vehicle and a wheel circumferential velocity occurring at the rear axle.

7. The method according to claim 5, further comprising comparing the rear axle slippage variable to at least one predetermined slippage limit value before activating the differential lock.

8. The method according to claim 5, further comprising activating the four-wheel drive before activating the differential lock.

9. The method according to claim 5, further comprising deactivating the activated differential lock on the basis of at least one of the rear axle slippage variable, the engine power of the drive engine, the status of at least one brake device associated with the rear axle, and a status regarding the differential lock.

10. A utility vehicle comprising:
    a rear axle driven by a drive engine;
    a rear axle differential on the rear axle;
    a front axle that is configured to be switched on to perform four-wheel drive; and
    a differential lock configured to lock the rear axle differential, the differential lock configured for activation on the basis of at least one of a rear axle slippage variable, which characterizes a drive slippage occurring at the rear axle, an engine power of the drive engine, a status of at least one brake device associated with the rear axle, and a status regarding the four-wheel drive;
    wherein the rear wheel slippage variable is determined from a ratio between an instantaneous travel speed of the utility vehicle and a wheel circumferential velocity occurring at the rear axle.

11. The utility vehicle according to claim 10, wherein the rear axle slippage variable is compared to at least one predetermined slippage limit value before the differential lock is activated.

12. The utility vehicle according to claim 10, wherein the four-wheel drive is configured for activation before the differential lock is activated.

13. A utility vehicle comprising:
    a rear axle driven by a drive engine;
    a rear axle differential on the rear axle;
    a front axle that is configured to be switched on to perform four-wheel drive; and
    a differential lock configured to lock the rear axle differential, the differential lock configured for activation on the basis of at least one of a rear axle slippage variable, which characterizes a drive slippage occurring at the rear axle, an engine power of the drive engine, a status of at least one brake device associated with the rear axle, and a status regarding the four-wheel drive;
    wherein the engine power is compared to a predetermined power limit value before the differential lock is activated.

14. The utility vehicle according to claim 13, wherein the rear wheel slippage variable is determined from a ratio between an instantaneous travel speed of the utility vehicle and a wheel circumferential velocity occurring at the rear axle.

15. The utility vehicle according to claim 13, wherein the rear axle slippage variable is compared to at least one predetermined slippage limit value before the differential lock is activated.

16. The utility vehicle according to claim 13, wherein the four-wheel drive is configured for activation before the differential lock is activated.

17. A utility vehicle comprising:
    a rear axle driven by a drive engine;
    a rear axle differential on the rear axle;
    a front axle that is configured to be switched on to perform four-wheel drive; and
    a differential lock configured to lock the rear axle differential, the differential lock configured for activation on the basis of at least one of a rear axle slippage variable, which characterizes a drive slippage occurring at the rear axle, an engine power of the drive engine, a status of at least one brake device associated with the rear axle, and a status regarding the four-wheel drive;
    wherein the activated differential lock is configured for deactivation on the basis of at least one of the rear axle slippage variable, the engine power of the drive engine, the status of at least one brake device associated with the rear axle, and a status regarding the differential lock.

18. The utility vehicle according to claim 17, wherein the rear wheel slippage variable is determined from a ratio between an instantaneous travel speed of the utility vehicle and a wheel circumferential velocity occurring at the rear axle.

19. The utility vehicle according to claim 17, wherein the rear axle slippage variable is compared to at least one predetermined slippage limit value before the differential lock is activated.

20. The utility vehicle according to claim 17, wherein the four-wheel drive is configured for activation before the differential lock is activated.

* * * * *